Aug. 14, 1951 — W. H. RATHERT ET AL — 2,563,867

LOG BUCKING CHUTE

Filed Dec. 4, 1945 — 8 Sheets-Sheet 1

INVENTORS
Charles A. Wilson
Walter H. Rathert
Donald W. Martin
Leon Wilson
Howard L. Murray

BY   ATTORNEY

INVENTORS
Charles A. Wilson
Walter H. Rathert
Donald W. Martin
Leon Wilson
Howard L. Murray

BY

ATTORNEY

Aug. 14, 1951     W. H. RATHERT ET AL     2,563,867
LOG BUCKING CHUTE Filed Dec. 4, 1945     8 Sheets-Sheet 3

INVENTORS
Charles A. Wilson
Walter H. Rathert
Donald W. Martin
Leon Wilson
Howard L. Murray

BY Harold D. Cook
ATTORNEY

Aug. 14, 1951 W. H. RATHERT ET AL 2,563,867
LOG BUCKING CHUTE
Filed Dec. 4, 1945 8 Sheets-Sheet 5

INVENTORS:
Charles A. Wilson
Walter H. Rathert
Donald W. Martin
Leon Wilson
Howard L. Murray

ATTORNEY

Aug. 14, 1951 W. H. RATHERT ET AL 2,563,867
LOG BUCKING CHUTE
Filed Dec. 4, 1945 8 Sheets-Sheet 6

INVENTORS:
Charles A. Wilson
Walter H. Rathert
Donald W. Martin
Leon Wilson
Howard L. Murray
By Harold L. Cook
ATTORNEY Patented Aug. 14, 1951

2,563,867

UNITED STATES PATENT OFFICE 2,563,867

LOG BUCKING CHUTE

Walter H. Rathert, Klickitat, and Leon Wilson, Howard L. Murray, and Charles A. Wilson, Glenwood, Wash., and Donald W. Martin, Coeur d'Alene, Idaho, assignors to J. Neils Lumber Company, Portland, Oreg., a corporation of Minnesota Application December 4, 1945, Serial No. 632,624

1 Claim. (Cl. 143—94)

This invention relates to a method of logging, and has particular reference to a novel log bucking chute for sawing tree length logs into merchantable lengths in carrying out certain steps of the method.

In logging heavy timber such as Douglas fir, ponderosa pine, and the like, it has heretofore been the general practice in commercial logging operations to trim the branches from felled trees and mark and saw each tree into the desired log lengths on the spot where the tree was felled. The sawed logs are then transported by one means or another through the forest to one or more loading points for some established transportation system such as a railroad, truck road, river or the like to carry the logs to a saw mill. As the logging operations progress farther into the forest such transportation facilities must be extended to provide loading stations within convenient reach of all merchantable trees in the area being logged. Ordinarily, a number of felling and bucking crews are employed in various regions of the area to fell trees and saw them into log lengths in sufficient quantity to provide the desired rate of production.

The logs are marked for the bucking crews by a scaler whose duty it is to determine the measure of the various lengths to be cut out of a tree to incur the least waste and to best fill the order on hand. Different kinds and grades of lumber are ordinarily sold in different standard lengths, and certain trees are suitable for one kind of lumber and not for another, depending upon their height up to the lowermost branch, the size and number of the branches in the upper part of the tree, the diameter of the trunk, the straightness and condition of the trunk in general, and numerous other variables. The length of the log indicates to the mill the kind of lumber to be cut from it. A scaler is a man of long experience in the industry who can judge all these variables at a glance and so mark the felled tree that it will furnish a miximum amount of lumber and a minimum amount of waste. It is apparent, then, that a scaler has considerable leeway in marking the trees to fill a particular order for lumber. If some of the felled trees are not exactly suitable to fill the immediate requirements, the scaler must decide whether to mark them for the maximum lumber yield regardless of whether the resulting lumber may be desired at the moment, or to mark them primarily to give the desired kind of lumber immediately, making waste a secondary consideration. In the course of a day's operation, an experienced scaler can succeed in utilizing the timber to the best advantage with very little waste, particularly if the lumber requirements are somewhat varied. As the operation proceeds, the scaler's tally will indicate how the demand for different kinds and grades of lumber is being filled, and he can mark the remaining trees accordingly so that when the total number of board feet have been cut the required amount of each kind of lumber will be supplied. The above procedure is a routine matter for an experienced scaler, and illustrates the manner in which logging operations are carried out in the forest to prevent waste.

One difficulty in this system, however, is that in most logging operations the area being logged at one time is too large for one scaler to cover. Several scalers are usually employed, each working with one or more felling and bucking crews in a particular locality. Inasmuch as log scaling is based upon the scaler's judgement acquired from his own personal experience, there is no consistent uniformity between the methods and results of different scalers. Each may be highly competent as an individual, but the combined results of their efforts when they are working far apart in the forest may be less satisfactory. Because of the personal equation and lack of satisfactory coordination between the different scalers, production of certain kinds of lumber may become unbalanced, with an excess of one kind or grade, and a deficiency in another.

Marking of the log lengths and sawing in the woods where the tree falls necessarily entails a certain amount of waste and allowance must be made therefor. The presence of underbrush and other obstructions makes it impossible to measure off the log lengths accurately, and so they are invariably marked long, the excess length being lost in the mill.

Another difficulty in the conventional method of logging in the manner above described is that the place for sawing marked on the felled tree by the scaler may be inconvenient or inaccessible to the bucking crew. Through either temptation or necessity, then, the bucking crew will cut a log long, thus upsetting the scaler's tally and possibly resulting in a considerable waste at the end of the tree. This situation is particularly troublesome in rough and brushy terrain where the bucking crews have many natural obstacles to overcome in their work. The result is that many logs arrive at the mill in lengths different than intended by the scaler, with probably an excess of the longer lengths.

If a log arrives at the mill two feet longer than intended by the scaler, it may be cut into an entirely different class or grade of lumber than that which ordinarily is cut from a log of the length marked by the scaler.

The object of the present invention is to provide a novel method of logging, and power operated apparatus for carrying out certain steps of the method, to substantially eliminate the above difficulties and shortcomings in conventional logging operations, and to expedite the operation in general. A particular object of the present invention is to provide a method and apparatus for handling tree length logs at a loading station or other point of collection where the production of the whole area is concentrated for buckling into merchantable lengths under the immediate supervision of a single scaler.

In practicing the method of the present invention the only attention given to the trees where they are felled is to trim off the branches. The tree length logs are then brought in to a point of collection, preferably on an established transportation system, more or less centrally located in the area being logged. At this point of collection all logs in the area are under the personal supervision of a single scaler who marks them for sawing into the desired log lengths. Novel equipment is provided for sawing the logs exactly at the places marked by the scaler so that his tally constitutes an accurate record of the day's production sent to the mill. In this way the scaling can be done most efficiently and without inconsistencies in the work of different scalers. The management of the logging operation can also constantly observe what kind of timber is being brought in and how it is being cut, so as to be constantly apprised as to the efficiency of the operation and as to variation in the timber encountered from region to region.

Another object of the present invention, as already mentioned, is to provide novel mechanical equipment for handling and sawing the logs at the point of collection. Such equipment comprises what is herein termed a log bucking chute equipped with winches and pull-in lines or cables for rolling large tree length logs into a conveyor trough or chute for endwise movement to selected positions beneath a power bucking saw. The logs are conveniently exposed in the chute alongside a measuring scale so that the scaler can readily judge where to mark them for cutting for the best yield of lumber. A conveyor is provided in the chute for moving the logs into accurate position for precision cutting exactly where marked.

The chute continues a distance approximating the maximum sawed length beyond the saw and is provided with a conveyor for pulling the sawed logs clear of the saw mechanism. A power operated ejector is provided in this part of the chute for rolling the sawed logs down where they may be picked up for loading.

The method and apparatus of the invention are best understood with reference to the accompanying drawings showing a preferred embodiment of bucking chute. This particular embodiment is described in accordance with the patent statutes for the purpose of illustrating a preferred manner of practicing the invention and not for the purpose of limiting the invention. Various changes in the construction and combination of parts will occur to those skilled in the art, and all such modifications are included in the invention, the same being limited only by the scope of the appended claim.

Figure 1:
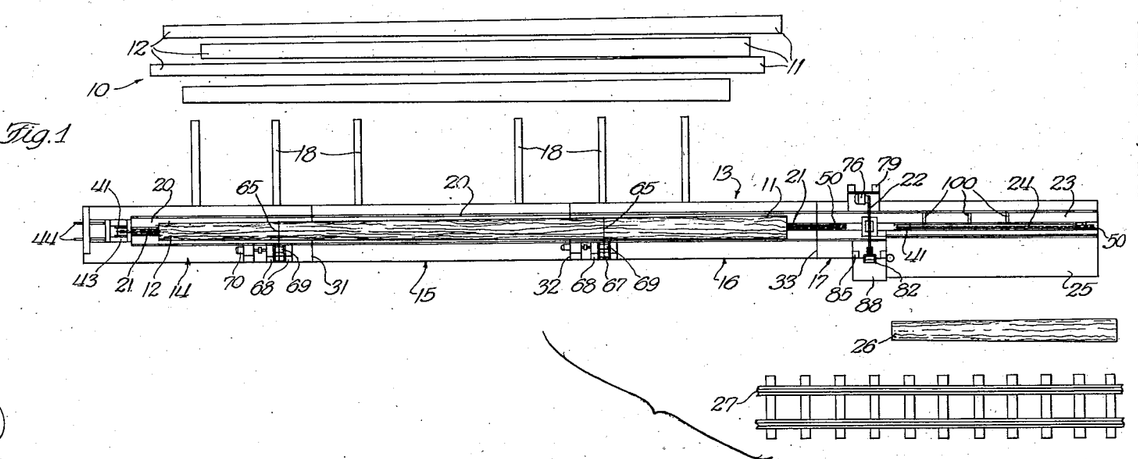
Figure 1 is a plan view showing the use of the present log bucking chute in carrying out the method of the invention.
Figure 1A:
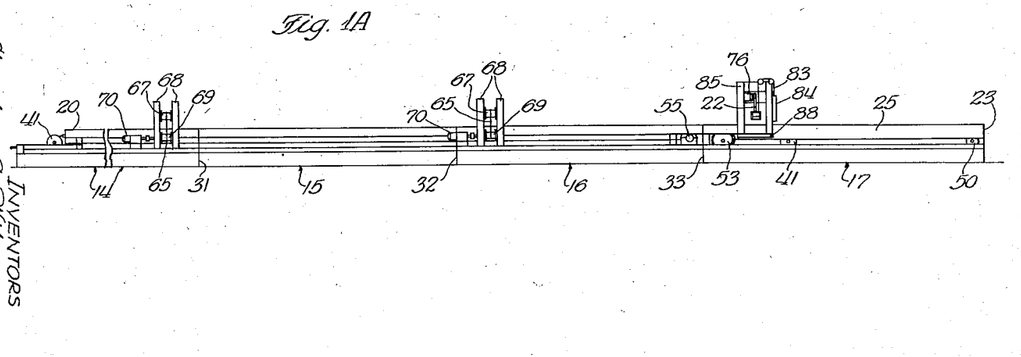
Figure 1a is a side elevation view of the bucking chute shown in Figure 1.

Figure 1 shows in plan view the general arrangement of the log bucking chute and the piles of sawed and unsawed logs in carrying out the method of the invention. The numeral 10 indicates a pile of tree length logs assembled at a point of collection for scaling and sawing into commercial lengths for transportation to a saw mill. These logs have been brought to this central point of collection from various places in a surrounding area where tree felling operations are in progress. Each of the logs represents a complete tree except for the branches and tops which have been trimmed off where the tree was felled. In assembling the logs at the point of collection the butt ends 11 and top ends 12 may be at either end of the pile, as viewed in Figure 1. The practice of the present method of logging is made commercially practicable and advantageous by the use of the novel log bucking chute hereinabove mentioned, for carrying out certain steps of the method in a manner adapted to large scale operations. The log bucking chute, designated generally by the numeral 13, comprises a plurality of portable sections 14 to 17, which are assembled preferably on gently sloping ground on the down-hill side of the log pile 10. A level spot is scraped off the ground for assembling the various sections of the chute, so that the top of the chute is on a level only slightly above the bottom of the log pile 10. Ramps 18 are then extended laterally from the chute in the direction of the log pile 10, and a pair of roll-in lines are provided for rolling logs one at a time up the ramp and into the chute.

In assembling the chute for operation, the sections 14 to 17 are brought together in end to end relation to provide a receiving trough 20 having a conveyor 21 extending throughout the length of the sections 14, 15 and 16 and terminating in the left end of section 17 at a log bucking saw 22. The section 17 also contains a delivery trough 23 having a conveyor 24 and ejecting mechanism, which will presently be described, for ejecting sawed logs down an inclined apron 25. The numeral 26 designates a sawed log which has just been ejected from the delivery chute 23 and which has rolled down to a convenient loading position alongside a logging railroad 27. As subsequent sawed logs are ejected they will form, with the log 26, a pile from which they may be picked up conveniently and loaded on a logging train for transportation to a saw mill.

The arrangement of the logs in the pile 10 at the point of collection causes each log to be disposed in the receiving trough 20 for convenient scaling and marking. Controls for the operation of the two conveyors, the saw and the ejecting mechanism are preferably located adjacent the saw to enable the sawyer to control most of the handling and sawing operations. These various mechanisms and the arrangement of the roll-in lines and winches will be described in detail as the description proceeds in connection with the showing of these details in the various figures of the drawings.

Figure 2:
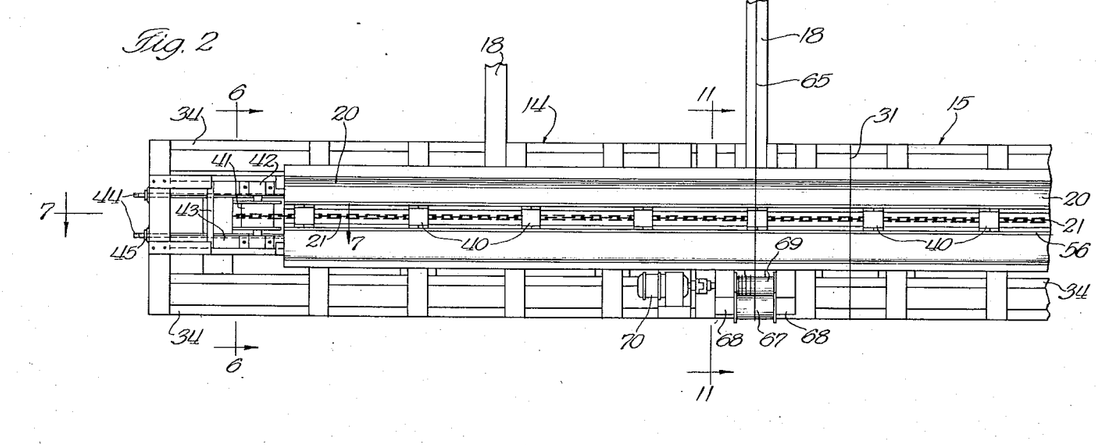
Figure 2 is an enlarged plan view of the left end of the log bucking chute as viewed in Figure 1.
Figure 3:
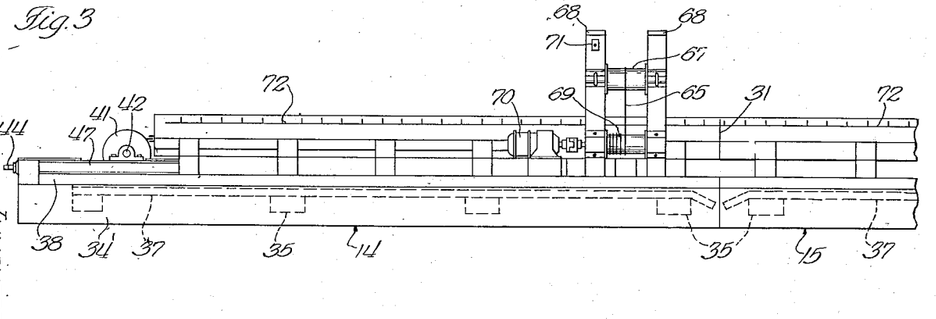
Figure 3 is an elevation view of the portion of the chute shown in Figure 2.

Figures 2 and 3 show in enlarged plan and elevation views the idler sprocket and length adjustments for the conveyor 21 and one of the roll-in winches, mounted on the end section 14. The other end of the bucking chute comprising the saw 22, delivery conveyor 24, and the log ejecting mechanism, all mounted in the section 17, is shown on enlarged plan and side elevation views in Figures 4 and 5. The joints between the sections 14, 15, 16 and 17 are designated by the numerals 31, 32 and 33.

Figure 6:
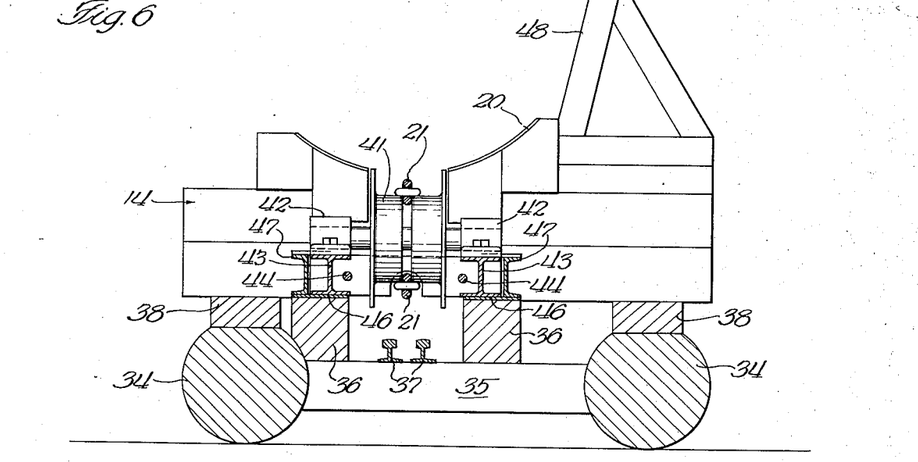
Figure 6 is a cross sectional view, drawn on a still larger scale, taken on the line 6—6 of Figure 2, and showing the idler pulley for the receiving conveyor.
Figure 7:
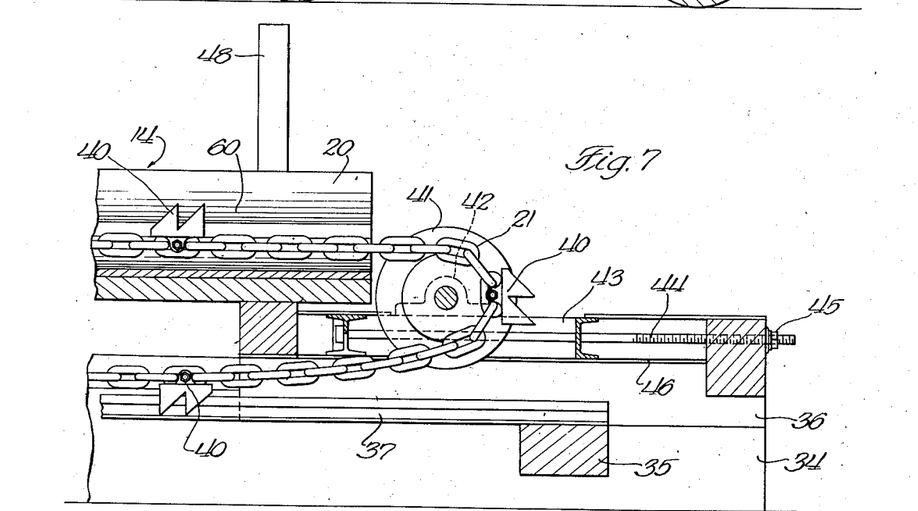
Figure 7 is a sectional view of the idler pulley shown in Figure 6, taken on the line 7—7 of Figure 2.

Reference is now made to Figures 2, 3, 6 and 7 showing the general construction of the portable sections and the idler end of the conveyor in section 14 in particular. Each of the portable sections of the chute comprises a timber framework carried by a pair of heavy skids 34 whereby these sections may be individually dragged or hauled through the forest in order to assemble the bucking chute complete at some central location within the timber cutting area. Interconnecting the skids 34 at intervals are cross members 35 supporting a pair of longitudinal timbers 36 and rails 37. The timbers 36 and additional longitudinal members 38 support a framework carrying a chute or trough section 20 which is metal lined and arcuate in cross section as shown in Figure 6 to support a log therein. There is a longitudinal slot at the bottom of the trough for the conveyor chain 21 which has log engaging dogs 40 attached thereto at spaced intervals. At the end of the conveyor the chain and dogs pass around a grooved idler pulley 41 mounted on a shaft journaled in bearings 42 on a sliding frame 43. Length adjustment for the conveyor chain is effected through a pair of long threaded rods 44 having nuts 45 which may be tightened to take unnecessary slack out of the chain. In effecting the adjustment the frame 43 slides on a pair of wear plates 46 between a pair of guide channels 47. The rails 37 slidably support the dogs 40 beneath the though on the return reach of the chain. Roll-in winches and lines will hereinafter be described for rolling logs into the chute from the left side as viewed in Figure 6, and a plurality of upstanding guard posts 48 may be provided to prevent the logs from rolling on out of the chute on the right side.

Figure 8:
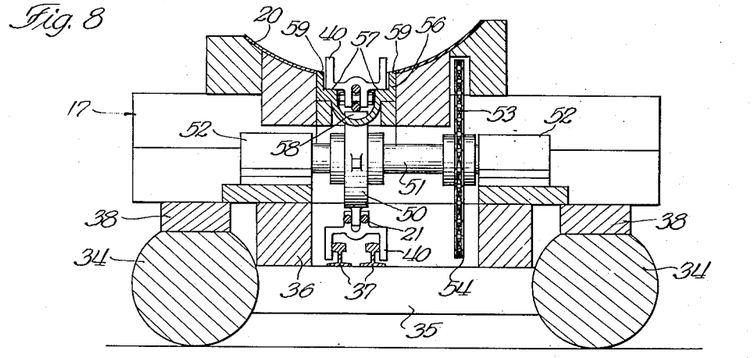
Figure 8 is a cross sectional view showing the driving sprocket for the receiving conveyor, taken on the line 8—8 of Figure 4.
Figure 9:
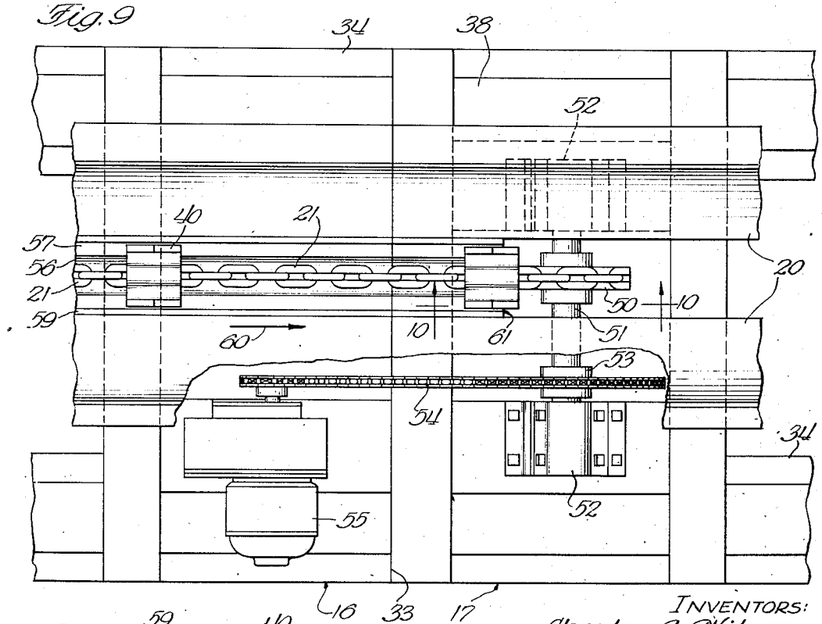
Figure 9 is a fragmentary plan view showing the driving sprocket for the receiving conveyor.
Figure 10:
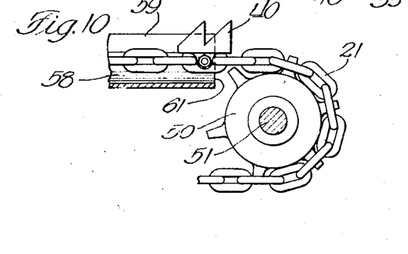
Figure 10 is a sectional view of the driving sprocket, taken on the line 10—10 in Figure 9.

The driven end of the conveyor is shown in Figures 8, 9 and 10, embracing sections 16 and 17. The chain is motivated by means of a driving sprocket 50 on a shaft 51 mounted in bearings 52 in the section 17 close to the joint 33. A large sprocket wheel 53 on the shaft 51 is rotated by a drive chain 54 extending across the joint 33 to a motor 55 mounted on the section 16. The conveyor chain 21 and the drive chain 54 are dismounted when the sections 16 and 17 are to be separated.

The previously mentioned conveyor slot in the bottom of the trough 20 is occupied by a conveyor guide 56 having a pair of horizontal shoulders 57 forming sliding surfaces for the dogs 40, and having a central cavity or trough 58 for the chain 21, as shown in Figure 8. The dogs 40 are guided and maintained in alignment by upstanding flanges 59 having top edges conforming with the contour of the inside of the trough in which the logs slide. The normal direction of movement of the conveyor is indicated by the arrows 60 in Figure 9, the chain and dogs leaving the end of the conveyor guide at 61 and passing over the driving sprocket 50 to return beneath the trough on the rails 37 to the idler roller 41. The motor 55 may be reversible so that a log in the trough may be backed up at any time. Thus, when the device is in operation the tension of the conveyor chain between the end sections 14 and 17 would serve to hold all the sections firmly together without the assistance of any fastening means, but fastening means may be provided at the joints 31, 32 and 33 if desired.

Figure 11:
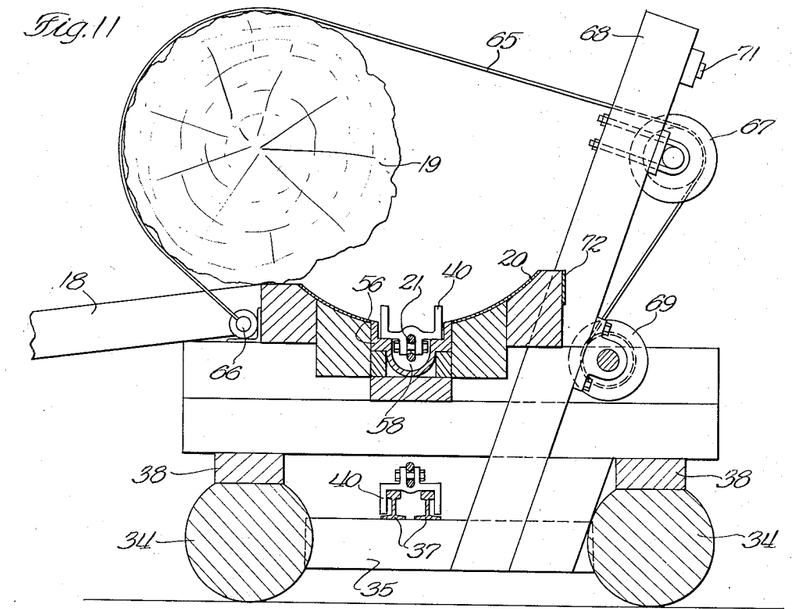
Figure 11 is a cross sectional view taken on the line 11—11 of Figure 2, showing one of the roll-in lines and winches in operation.
Figure 12:
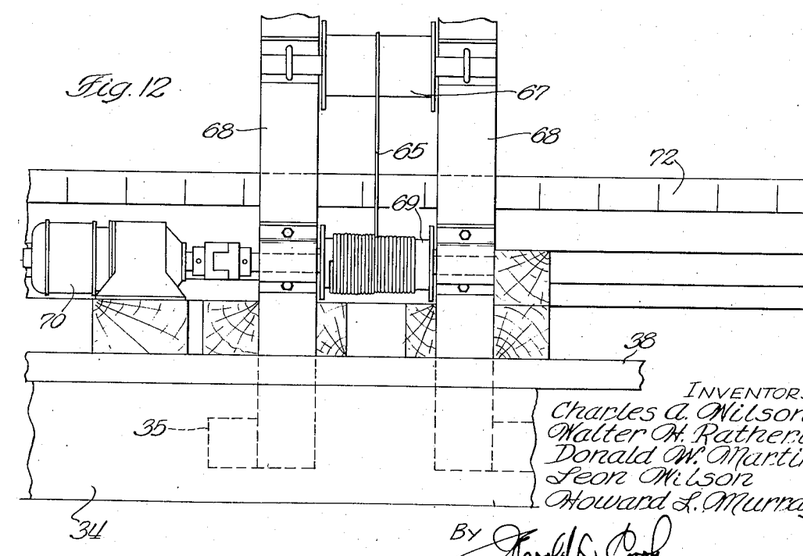
Figure 12 is an elevational view of the roll-in line and winch mechanism shown in Figure 11.

The previously mentioned roll-in lines for rolling logs from the pile 10 up the ramp 18 are designated by the numeral 65, and their positions along the chute are shown in Figure 1, one of these lines being in section 14 and the other being in section 16. The operating mechanisms for the two lines are identical and the one in section 14 will be described with general reference to Figures 2 and 3 and particular reference to Figures 11 and 12. Each of the lines 65 has a free end provided with a quick detachable connection 66 which may be passed over the nearest log in the pile 10 and then returned underneath the log and connected with the rim of the trough as shown in Figure 11. The line is trained over an elevated fair-lead drum 67 mounted between a pair of sturdy stanchions 68 and wrapped on a winch drum 69 driven by a motor 70 through suitable reduction gearing. As the cable 65 winds on the winch 69 the tree length log rolls easily up the ramp 18 and into the conveyor trough as shown with reference to the log 19 in Figure 11 which has just reached the top of the ramp. The stanchions 68 also serve as back stops to prevent the log from rolling on out of the trough and to assist in aligning it in the trough if it is crooked or twisted. A dual push button control 71 for both winches is provided at either one or both of the winches.

The fair-lead drum 67 receives the line 65 through a wide horizontal angle and enables the line to be used for a variety of purposes in straightening out the log pile and getting the logs into the chute. By rubbing the line on one of the stanchions it may even be used to exert a pull lengthwise of the trough, if necessary. Thus, an occasional crooked log, or a log with stubs of branches remaining thereon, which does not have sufficient tractive bearing upon the dogs 40, may be assisted along the trough by one of the lines 65 into position for the first cut. Usually after the first cut any log which is straight enough to be merchantable will fall into the trough to be engaged and moved by the dogs 40. A scale 72 is preferably provided along the edge of the trough for convenience in measuring and marking the log, and a platform may be added if the trough is inconveniently high above the ground behind the winches and their controls.

Figure 4:
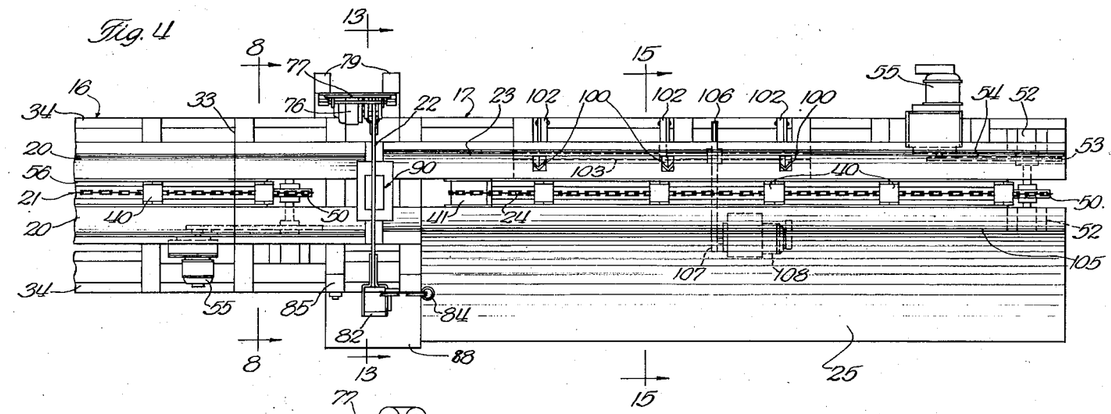
Figure 4 is an enlarged plan view of the right end of the log bucking chute shown in Figure 1.
Figure 5:
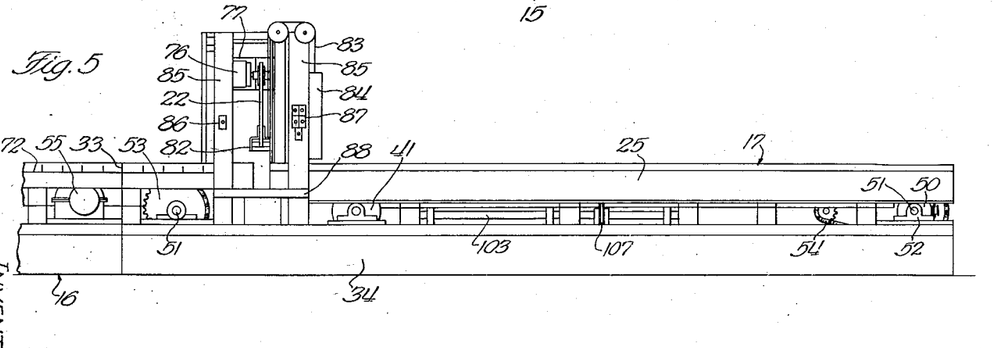
Figure 5 is an elevation view of the portion of the chute shown in Figure 4.
Figure 13:
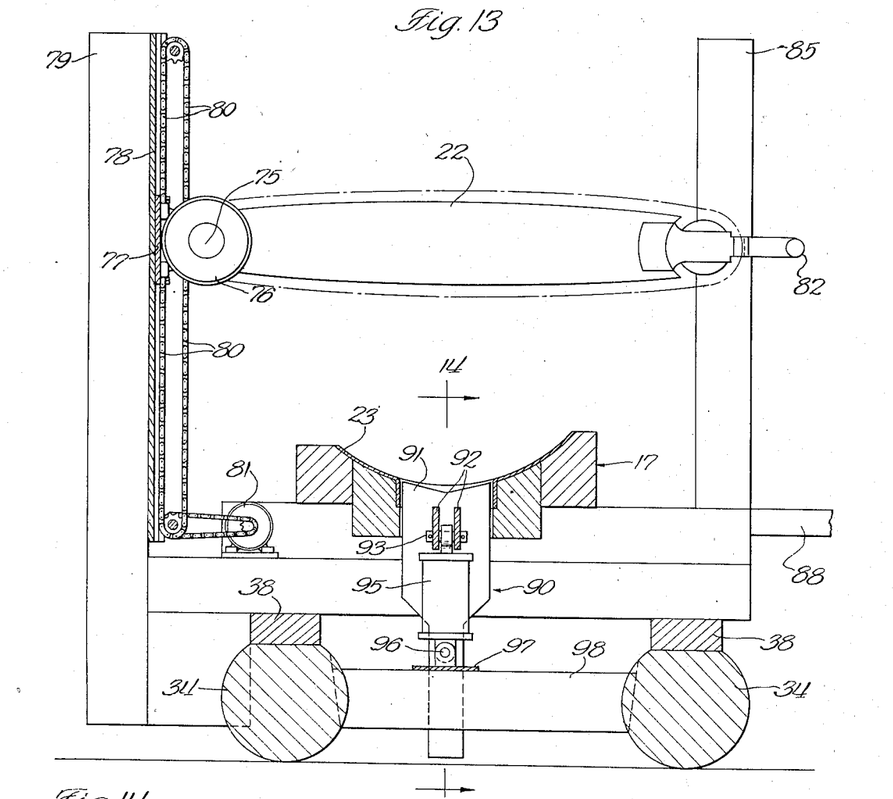
Figure 13 is a cross sectional view taken on the line 13—13 of Figure 4, showing the bucking saw and hydraulic jack mechanism.
Figure 14:
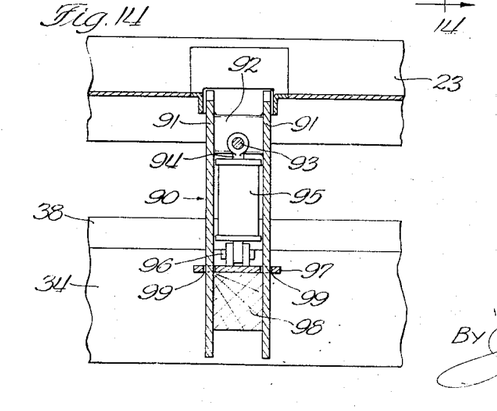
Figure 14 is a sectional view through the jack, taken on the line 14—14 of Figure 13.
Figure 15:
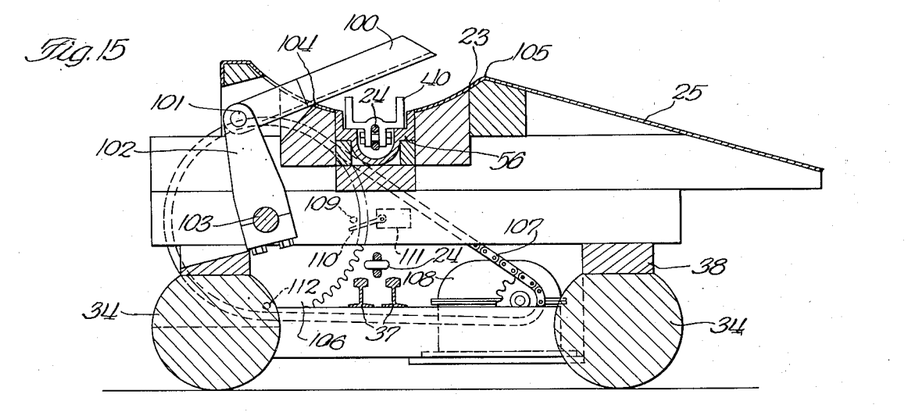
Figure 15 is a cross sectional view taken on the line 15—15 of Figure 4, showing the log ejecting mechanism in the receiving trough.
Figure 16:
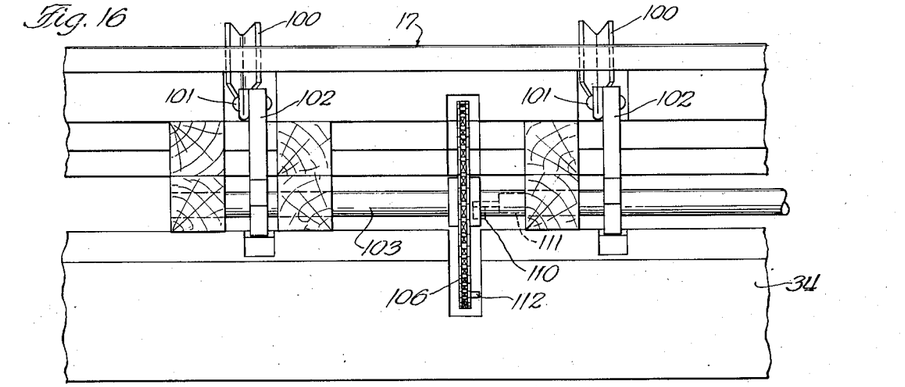
Figure 16 is a fragmentary elevational view of the log ejecting mechanism shown in Figure 15.

The logs are sawed by a saw 22 of novel construction mounted between the receiving conveyor 21 and the delivery conveyor 24 as shown in Figures 4, 5 and 13. The saw 22 comprises a chain saw pivotally mounted at 75 concentric with the shaft of a driving motor 76 which is mounted on a vertically slidable plate 77. The plate 77 slides in a vertical track 78 attached to upright posts 79 on the section 17. Slider plate 77 may be raised and lowered at will by means of an endless chain 80 driven by a motor 81 to rock the saw in sawing a large log. The free end of the saw is equipped with a handle 82. Adjacent the saw are start and stop push button controls for the motor 76 and start, stop and reverse controls for the motor 81. The handle end of the saw is supported by a counterweight cable 83 passing over pulleys and attached to a balancing weight within a tubular guide member 84. A pair of upright posts 85 on each side of the saw serve to support the counterweight mechanism and also to mount a plurality of push button controls 86 and 87 for the various power operated mechanisms. The numeral 88 designates a platform for the saw operator.

To facilitate the sawing operation and prevent pinching, a hydraulic jack 90 is mounted directly beneath the saw to raise a portion of the log off the bottom of the troughs 20 and 23. The jack comprises a pair of jaw plates 91 which are retractible slightly beneath the bottom of the trough in an opening or gap therein so as not to interfere with the log when it is moved along the troughs. Jaw plates 91 are interconnected by members 92 having a pin connection 93 with the end of a piston rod 94 extending upwardly from an hydraulic cylinder 95. The lower end of the hydraulic cylinder is supported by a pin connection 96 on a plate 97 on a transverse timber 98 or other convenient structural member. The plate 97 extends beyond the edges of the cross member 98, and is provided with slots 99 in these extending portions for receiving and guiding the lower ends of the jaw plates 91. A source of hydraulic pressure is connected with the cylinder 95 to raise the jaw plates 91 some distance above the bottom of the chute so as to lift a portion of a log sufficiently to tension the wood in the saw cut. The saw is mounted in vertical alignment with the axis of the cylinder 95 so that the space between the upper ends of the jaw members 91 above the members 92 provides clearance for the saw teeth to make a clean cut through the log. The jack is preferably actuated by an electrically driven hydraulic pump under the control of one of the push buttons in the group 87.

Reference is made to the copending application of Walter H. Rathert and Charles A. Wilson, Serial No. 632,625, filed December 4, 1945, issued April 17, 1951, as Patent No. 2,549,236, for Log Bucking Saw, relating to the jack and saw operating mechanism.

Figure 17:
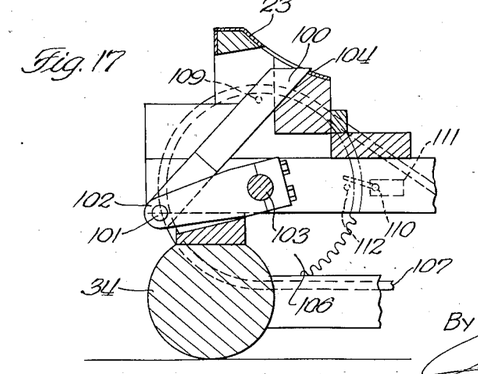
Figure 17 is a fragmentary sectional view corresponding to Figure 15, but showing the ejecting mechanism in retracted position.

After the sawing operation the sawed logs may be moved endwise away from the saw on conveyor 24 for removal from the log bucking chute by an ejecting mechanism which will now be described with reference to Figures 4, 5, 15, 16 and 17. The conveyor 24 is similar to the conveyor 21 except that it is entirely contained within the section 17. The idler pulley, driving sprocket, and chain drive to the motor are all similar to the corresponding elements associated with the conveyor 21 and bear like reference numerals. When a cut log has been moved by the conveyor 24 sufficiently to clear the posts 85 and the operator's platform 88, it is in a position to be ejected from the trough 23 to roll laterally off the sloping apron 25 to a position on the ground near the track 27, as represented by the log 26 in Figure 1. The ejecting action is performed by a plurality of ejector arms or pushers 100 which may be extended into the side of the trough 23 to push out a log and then retracted to avoid interference with the movement of the next log on the conveyor. In the present embodiment there are three pusher arms 100 loosely pivoted at 101 on three spaced crank arms 102 on a crank shaft 103 journaled in the framework of the section 17. The arms 100 ride loosely on edge portions 104 in slots or openings in the trough at one side of the conveyor so that when they are extended into the trough in approaching the position shown in Figure 15 they are effective to boost a log up off the conveyor and to roll it over the trough edge 105 to start it rolling down the apron 25. After ejecting action is completed, a reverse movement of the crank shaft 103 immediately returns the pusher arms to retracted positions as shown in Figure 17.

Means are provided for performing the above described ejecting cycle automatically in response to a push button starter. Rotation of the shaft 103 is produced by a large sprocket wheel 106 driven by a chain 107 from an electric motor 108. Motor operation is initiated by one of the push buttons in the control group 87 to rotate the shaft 103 from its normal rest position shown in Figure 17 in a clockwise direction to the position shown in Figure 15 in the course of which movement the pushers 100 engage a log and move it forcibly out of the trough in the manner described. A cam or pin 109 is attached to the sprocket wheel 106 in a position to engage a follower 110 in the manner shown in Figure 15 after about 90 degrees rotation from the rest position to operate a reversing switch 111. Thus, in Figure 15, the cam 109 has just operated the switch 111 to reverse the motor 108, thereby determining the limit of movement of the parts in an ejecting operation. The motor 108 then immediately reverses the rotation of the shaft 103 to withdraw the pushers out of the trough. Another cam or pin 112 is positioned on the sprocket wheel 106 to engage the follower 110 in reverse movement to stop the motor when the parts have returned to the rest position of Figure 17. The motor circuits are arranged so that the push button starting switch can complete a motor circuit for clockwise rotation when the parts are in rest position, the switch 111 operating as a reversing switch when actuated in one direction and as a stopping switch when actuated in the opposite direction. When once started, the motor continues to run until it is reversed by cam 109 in the manner described. Thereafter, the motor runs in reverse direction until stopped by cam 112. After stopping, the starting circuit is again effective to function when called upon to repeat the cycle. The various motor circuits may be made directly by the start button and the switch 111, but it is preferred to employ heavy duty relays or contactors to switch the power circuits so that switch 111 and the push button switch need carry only a control current for the relay windings. In lieu of the single switch 111, separate reverse and stop switches may be arranged for actuation by the respective cams 109 and 112, the switches having resilient followers which return to their initial positions after withdrawal of the cams. Electrical power for the various motors may be supplied by a portable generating plant mounted on skids for transportation along with the bucking chute.

Thus it is seen from the foregoing description that the controls for the various operating mechanisms, except the roll-in lines, are centralized at the sawing station as indicated in Figure 5. By means of the push button switch 86 the conveyor 21 may be started, stopped and reversed to position marked tree length logs accurately under the saw. In moving a log into position for sawing, the conveyor 24 may be operated in conjunction with the conveyor 21 to carry the butt end of the log, the push button switch for the conveyor 24 being contained in the group 87 so that the saw operator standing in line with the saw can control one conveyor with each hand while watching the mark on the log as it comes under the saw. By means of another switch in the group 87 the hydraulic jack is then caused to raise the log for sawing, after which the saw is operated to cut a log of the desired length. After the saw cut is completed the jack is lowered and the sawed log length is moved out a short distance on the conveyor 24 in preparation for ejection by the ejector arms 100. These last three operations, all taking place on the right side of the sawing station as viewed in Figure 5, are controlled by switches in the group 87 likewise on the right side of the sawing station.

The various machine functions of the log bucking chute are all under the immediate observation of the saw operator, and all these operations except the operation of the winches 69 are controlled by the saw operator himself. By reason of his elevation above the ground level, the saw operator is also in a position to observe the size and condition of logs as they are brought in from the forest, and to supervise the arrangement and manner of piling the logs in the pile 10, if necessary. In carrying out the method with the aid of the present apparatus, there is a continuous flow of tree length logs from various parts of the timber cutting area to the point of collection, and thence up the ramp 18, one log at a time, to the receiving trough 20. The logs are then moved lengthwise in the receiving trough for sawing, and lengthwise further in the same direction in the delivery trough after sawing, from whence they are moved out of the log bucking chute on the opposite side from which they entered. In this arrangement of the work flow unprocessed material is continually approaching from the front of the saw operator and to his left, thence passing across in front of the operator, and finally moving to his right and passing out in a processed state to his rear for transportation out of the locality. The centralized control of the log bucking operation for a whole logging area in this manner makes for increased efficiency of the logging operation in general, and greatly expedites the bucking operation in particular.

Having now described our invention and in what manner the same may be used, what we claim as new and desire to protect by Letters Patent is:

In a log bucking chute having a conveyor chain therein for moving logs lengthwise, a shaft extending lengthwise of the chute, a gear on said shaft, a motor for driving said gear, crank arms on said shaft, pusher arms pivotally connected to said crank arms and each having one end adapted to extend into said chute to push a log laterally out of said chute in one position of said crank arms and retractible from said chute in another position of said crank arms, a manual switch for starting said motor to initiate a log ejecting operation, a switch adjacent said gear for reversing and stopping said motor, means on said gear arranged to engage said last named switch to reverse said motor after said pusher arms have been extended into said chute to eject a log therefrom, and means on said gear to operate said switch to stop said motor after reversal when said pusher arms have been retracted from said chute.

WALTER H. RATHERT.
LEON WILSON.
HOWARD L. MURRAY.
CHARLES A. WILSON.
DONALD W. MARTIN.

REFERENCES CITED

The following references are of record in the file of this patent:

UNITED STATES PATENTS

| Number | Name | Date |
| --- | --- | --- |
| 285,982 | Fachmon | Oct. 2, 1883 |
| 400,790 | Pratt et al. | Apr. 2, 1889 |
| 429,926 | Kuntz et al. | June 10, 1890 |
| 497,098 | Kelly | May 9, 1893 |
| 526,624 | Hill | Sept. 25, 1894 |
| 764,717 | Foshee | July 12, 1904 |
| 825,518 | Cox | July 10, 1906 |
| 966,488 | Torseth | Aug. 9, 1910 |
| 1,001,272 | Howard | Aug. 22, 1911 |
| 1,695,757 | Camp | Dec. 18, 1928 |
| 1,835,376 | Cherney | Dec. 8, 1931 |
| 1,856,169 | Rosener et al. | May 3, 1932 |
| 1,861,786 | Buchan et al. | June 7, 1932 |
| 2,029,821 | Hathaway et al. | Feb. 4, 1936 |
| 2,039,017 | McLeod | Apr. 28, 1936 |
| 2,286,666 | Briggs | June 16, 1942 |
| 2,410,887 | Locke | Nov. 12, 1946 |

FOREIGN PATENTS

| Number | Country | Date |
| --- | --- | --- |
| 354,228 | France | July 21, 1905 |